US007519624B2

(12) United States Patent
Korupolu et al.

(10) Patent No.: US 7,519,624 B2
(45) Date of Patent: Apr. 14, 2009

(54) METHOD FOR PROACTIVE IMPACT ANALYSIS OF POLICY-BASED STORAGE SYSTEMS

(75) Inventors: Madhukar R. Korupolu, Sunnyvale, CA (US); Aameek Singh, Smyrna, GA (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 11/281,739

(22) Filed: Nov. 16, 2005

(65) Prior Publication Data

US 2007/0112870 A1    May 17, 2007

(51) Int. Cl.
G06F 12/00 (2006.01)
G06F 17/30 (2006.01)
G06F 15/173 (2006.01)
(52) U.S. Cl. ...................... 707/200; 709/224
(58) Field of Classification Search ............. 707/200; 718/104
See application file for complete search history.

(56) References Cited

U.S. PATENT DOCUMENTS

| 4,412,285 | A | * | 10/1983 | Neches et al. ............. 709/252 |
| 5,784,702 | A |   | 7/1998  | Greenstein et al. |
| 6,895,485 | B1 |  | 5/2005  | DeKoning et al. |
| 6,898,608 | B2 |  | 5/2005  | Hopeman et al. |
| 7,082,102 | B1 | * | 7/2006 | Wright ...................... 370/229 |
| 7,133,907 | B2 | * | 11/2006 | Carlson et al. ............. 709/220 |
| 7,233,935 | B1 | * | 6/2007 | Chandler ..................... 706/47 |
| 7,269,612 | B2 | * | 9/2007 | Devarakonda et al. ...... 707/205 |
| 2004/0148485 | A1 | | 7/2004 | Suzuki |
| 2004/0205089 | A1 | | 10/2004 | Alon et al. |
| 2004/0243692 | A1 | | 12/2004 | Arnold et al. |
| 2004/0243699 | A1 | * | 12/2004 | Koclanes et al. ........... 709/224 |
| 2005/0050270 | A1 | | 3/2005 | Horn et al. |
| 2005/0086195 | A1 | * | 4/2005 | Tan et al. ...................... 707/1 |
| 2005/0091353 | A1 | | 4/2005 | Gopisetty et al. |
| 2005/0131982 | A1 | * | 6/2005 | Yamasaki et al. ........... 709/200 |
| 2005/0149940 | A1 | * | 7/2005 | Calinescu et al. ........... 718/104 |

OTHER PUBLICATIONS

Common Object Request Broker Architecture: Core specification, Mar. 12, 2004, 3.0.3—Editorial Changes, 4.8.1, 4.9.1, 14.2.*

* cited by examiner

Primary Examiner—Pierre M. Vital
Assistant Examiner—Jason Liao
(74) Attorney, Agent, or Firm—Samuel A. Kassatly; Shimokaji & Associates, P.C.

(57) ABSTRACT

A system efficiently and proactively assesses the impact of user's actions on a network storage system. The system generally operates on a storage area network that includes a database represented by states and policies, before the user action is executed. The system comprises a storage monitor that captures a snapshot of the database states. An impact analysis module of the system then applies a user action to the snapshot; and further selectively applies at least some of the policies to the snapshot. The impact analysis module simulates the user action on the snapshot without applying actually changes to the database, and further analyzes whether the simulated user action violates at least one applied policy. The system takes the appropriate action based on the result of the analysis.

9 Claims, 10 Drawing Sheets

METHOD FOR PROACTIVE IMPACT ANALYSIS OF POLICY-BASED STORAGE SYSTEMS

FIELD OF THE INVENTION

The present invention generally relates to network storage systems. More specifically, the present invention relates to a proactive impact analysis system operated in a policy-based network storage system that enables proactive assessments of impacts of policy change actions on a variety of storage system parameters before execution of these actions.

BACKGROUND OF THE INVENTION

With the exponential growth in Internet communication powered by ever increasingly high-bandwidth applications, the need for digital information management has concomitantly increased dramatically. Network storage systems, such as SANs (Storage Area Networks) are designed to meet the demands of information processing and the requirements of performance, availability, and scalability in such complex storage systems.

Among network storage systems, SANs are deployed in enterprise environments at an increasing pace in order to gain performance advantages for business benefits. SANs are dedicated networks of interconnected devices (for example, disks and tapes) and servers to share a common communication in a shared storage infrastructure. The large scale and growth rate of SANs driven by enterprise demands for internet communication and high-bandwidth applications lead to a rapid increase in the complexity of management of such network storage systems. Any change to such large-scaled SANs is usually a high-risk action that could potentially cause unintended consequences. Often, system administrators of SANs have to carefully analyze the impact of a desired change before actually applying it to the SANs. This task is usually referred to as an impact analysis, change analysis, or what-if analysis.

Due to the complexity of the SAN, the impact analysis is very important as one resource attribute can significantly impact even seemingly unrelated resources. For example, increasing the transaction rate of a workload can violate the QoS (Quality of Service) requirements of a seldom run workload due to the contention at a common switch. Additionally, SANs are initially designed using various best practice policies such as single host types in one zone, redundant paths between hosts and storage, etc., but progressive changes to the SAN such as adding hosts or workloads further complicate the process of adhering to those best practices.

Manually analyzing the impact of a particular change does not scale well, as the size of the SAN infrastructure increases with respect to the number of devices, best practices policies, and the number of applications. Thus, when deploying new applications, hosts and storage controllers can be down in the order of days or weeks because system administrators have to reactively try to correct the problems associated with the deployment.

Typically, change management tools have been reactive in their scope in that they keep snapshots of the previous state of the system, and the system administrators either revert to or compare the current state with a previous state after encountering a problem. Additionally, system administrators do not have a way of assessing the impact of their proposed changes with respect to a future state of the system. For example, a system administrator could potentially allocate increased bandwidth to an application by taking only the current workload into account. However, this could conflict with other scheduled jobs or known trends in workload surges that will increase the workload on the system in the future. Thus, it is important for system administrators to assess the impact of their actions not just with respect to the current state of the systems but also with respect to future events.

With the recent autonomic computing initiative, policy based management of storage resources is increasingly being adopted by industry. The SNIA (Storage Networking Industry Association) standardization body is developing a standard for describing policies associated with networked-enabled storage systems. The policy definition uses 4-tuple rules with an "if" condition that specifies what needs to be evaluated, a "then" clause indicating the action that needs to be taken when the policy is triggered, a broad scope that identifies the resources that would impact the policy, and a priority that is used to break ties when multiple policies are triggered. Policy-enabled SANs are inherently more complex to analyze, since an operation can potentially impact hundreds of policies, each of which will have to be evaluated in connection to other policies. In addition, a policy violation can automatically trigger an action that can also contribute to the overall impact on the SAN. For example, a policy "if the transaction-rate of an application goes below a threshold value, then start a backup job" may be triggered and therefore results in an action of starting a backup job that impacts the SAN similar to introducing a new workload, like causing switch contentions, increased bandwidth utilizations and increased controller loads.

Several conventional approaches in the field of policy-based network storage systems have been proposed. One such conventional approach uses a predictive impact analysis for change management functionality. However, the impact analysis is performed only for a small set of policies mainly related to security LUN (Logical Unit Number) Masking. Furthermore, along with the narrow scope of policies, this conventional approach exclusively supports notification as the policy action, and does not permit self-correcting and automatic actions that further impact the SAN. These limitations present an important shortcoming of this conventional approach, since typically system administrators would specify policy actions in order to correct erroneous events and would be most interested in analyzing the impact of the triggered actions that could cause a significant performance overhead.

Another conventional approach addresses a wider range of policies. However, its policy evaluation techniques use a coarse classification of scopes. In such a scheme, each policy is designated as a scope to denote the class of entities such as hosts, HBAs (Host Bus Adapters), etc. The motivation for such scope-based classification is to allow system administrators to check for a select class of entities and policies in the SAN. This form of classification is not very efficient for impact-analysis due to the following reasons: (1) lack of granularity whereby some policies have to be classified into many higher-level scopes which causes inefficient evaluation, e.g., a policy that requires a Vendor-A host to be connected only to Vendor-S storage has to be classified into "Hosts", "Storage", and "Network" scopes since some changes to elements of the three scopes can cause the policy evaluation; but this classification causes their evaluation for any event in the three scopes, (2) failure to identify relevant SAN regions that can result in duplicate regions in the path traversal for a policy evaluation in order to provide a correct general solution, and (3) failure to exploit the locality of data across various policies such as in a scenario of having two distinct policies for an action evaluated without using an efficient method of caching the results from one for use to evaluate the other.

Yet other conventional approaches exclusively address performance policies called SLO (Service Level Objectives). While these conventional approaches focus on a very limited subset of policies, they fail to consider the impact of user actions on these policies or the impact of their triggered actions on the SAN.

A further disadvantage of the foregoing conventional approaches lies in the fact the impact analysis is done in a reactive mode with respect to the current state of the systems without proactively assessing the impact on the future state of the systems.

In view of the inadequacy of the conventional methods for analyzing impact of policy changes on policy-based storage area network, there is still an unsatisfied need for an impact analysis system that can perform in a wide range of policies to proactively assess the impact of the actions of these policies on a variety of system parameters prior to making those changes.

SUMMARY OF THE INVENTION

The present invention satisfies this need, and presents a system, a computer program product, and an associated method, referred to as "the system" or "the present system" for efficiently and proactively assessing the impact of user's actions on a network storage system.

In one embodiment, the system generally operates on a storage area network that includes a database represented by states and policies, before the user action is executed. The system comprises a storage monitor that captures a snapshot of the database states. An impact analysis module of the system then simulates applying a user action to the snapshot; and further selectively applies at least some of the policies to the snapshot.

The impact analysis module simulates the user action on the snapshot without applying actually changes to the database, and further analyzes whether the simulated user action violates at least one applied policy. The system takes the appropriate action based on the result of the analysis.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
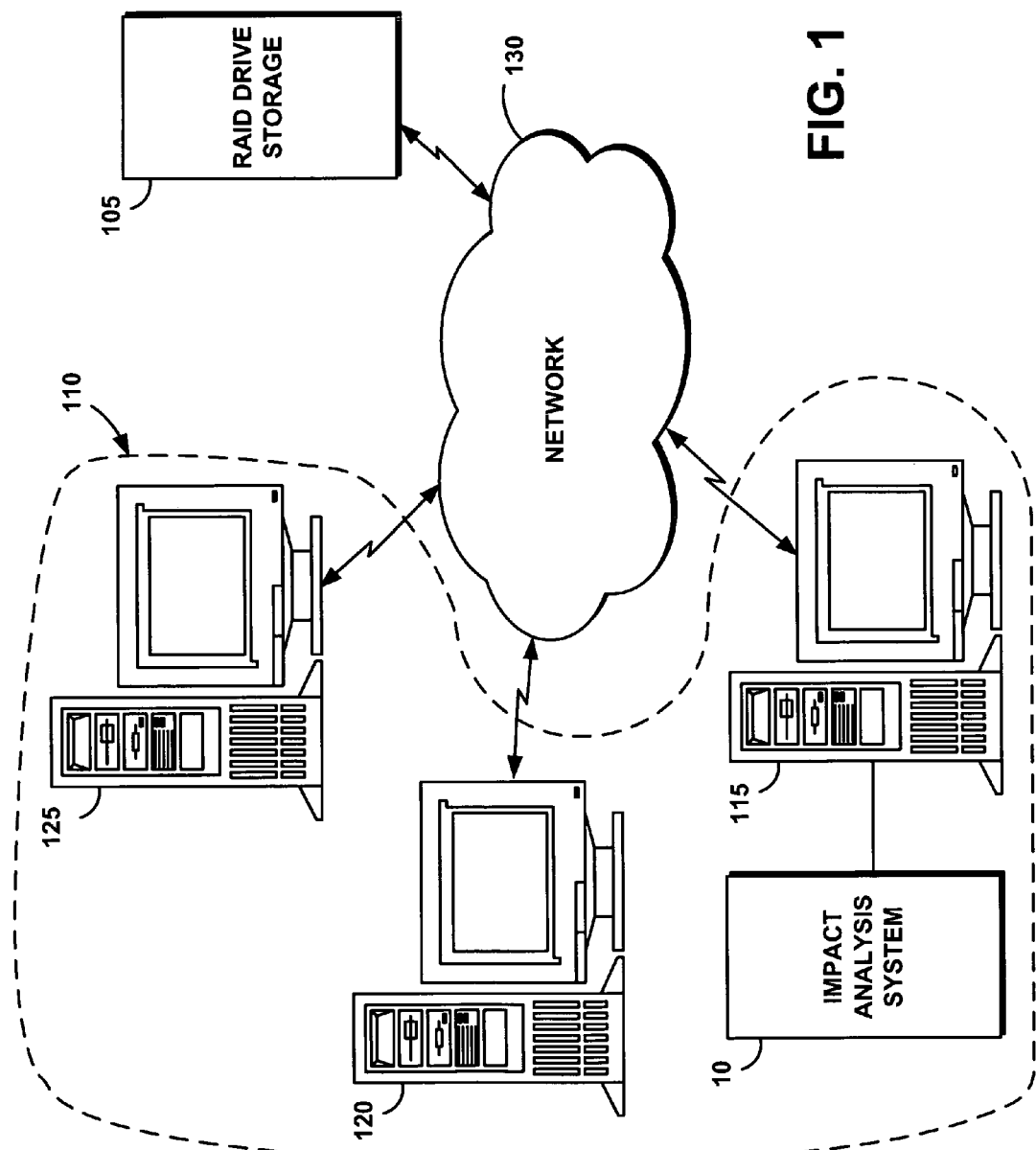
FIG. 1 is a schematic illustration of an exemplary network storage system in which an impact analysis system of the present invention can be used.

FIG. 1 portrays an exemplary overall environment in which a system, a computer program product, and an associated method (the impact analysis system 10 or the "system 10") for efficiently and proactively assessing the impact of users actions on a network storage system before the execution of these user actions, may be used according to the present invention. This environment includes, for example, a network storage system 100 (SAN) that generally comprises a variety of storage devices such as a plurality of interconnected RAID (Redundant Array of Independent Disks) drive storage devices 105 and a server cluster 110.

In one embodiment, the server cluster 110 includes heterogeneous servers, such as a file server 115, a database server 120, and an application server 125. The storage devices 105 and the server cluster 110 can be interconnected via a network 130 that enables a high speed communication among the network devices.

System 10 can reside on any component of the server cluster 110, or it can be connected directly to the network 130. System 10 comprises a software program code or a computer program product that is typically embedded within, or installed on a computer such as the file server 115. Alternatively, system 10 can be saved on a suitable storage medium such as a diskette, a CD, a hard drive, or like devices.

Figure 2:
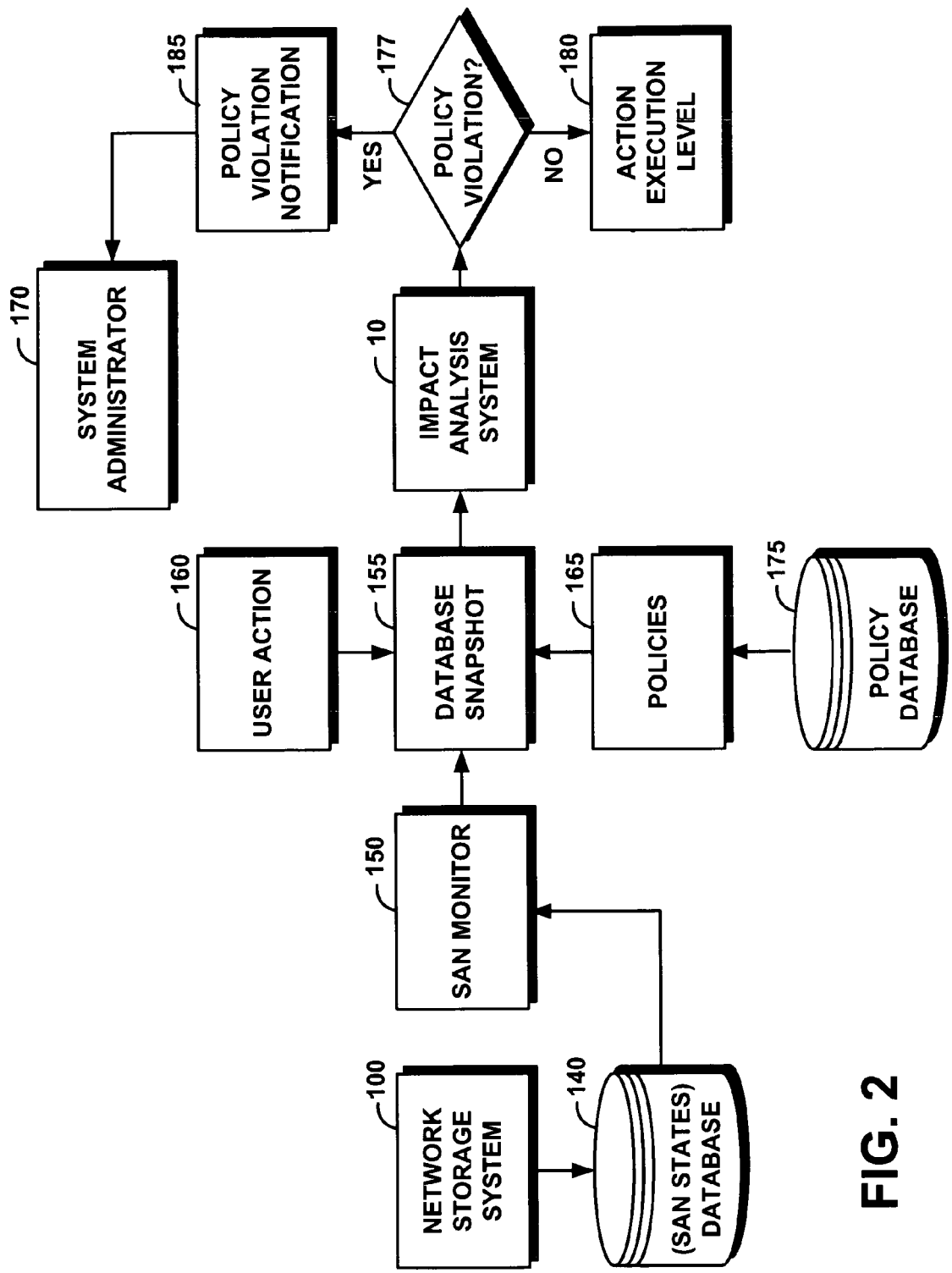
FIG. 2 is a block diagram illustrating the data flow using the impact analysis system of FIG. 1, for managing a network storage system via a policy-based procedure.

FIG. 2 is a process diagram illustrating the data flow using the impact analysis system 10 according to the present invention, for managing the network storage system 100 via a policy-based procedure. The network storage system 100 is connected to a database 140 that stores the current states of the network storage system 100.

A SAN monitor 150 captures a database snapshot 155 of the current SAN states of the database 140. The present system 10 operates on the database snapshot 155 by proactively analyzing the impact of a user action 160 on the database snapshot 155, subject to a plurality of policies 165 stored in a policy database 175.

Upon receiving the input of the user action 160, the present system 10 performs a proactive impact analysis on the database snapshot 155 to check for a potential policy violation resulting from the user action 160. The impact analysis system 10 determines at decision block 177 if the user action 160 violates at least one of the policies 165.

If system 10 determines at 177 that the policies 165 are not violated, the user action 160 is forwarded to an action execution level 180, whereupon a number of actions can be taken, such as performing a specific action, sending results to a GUI (Graphical User's Interface), or logging the results.

Figure 3:
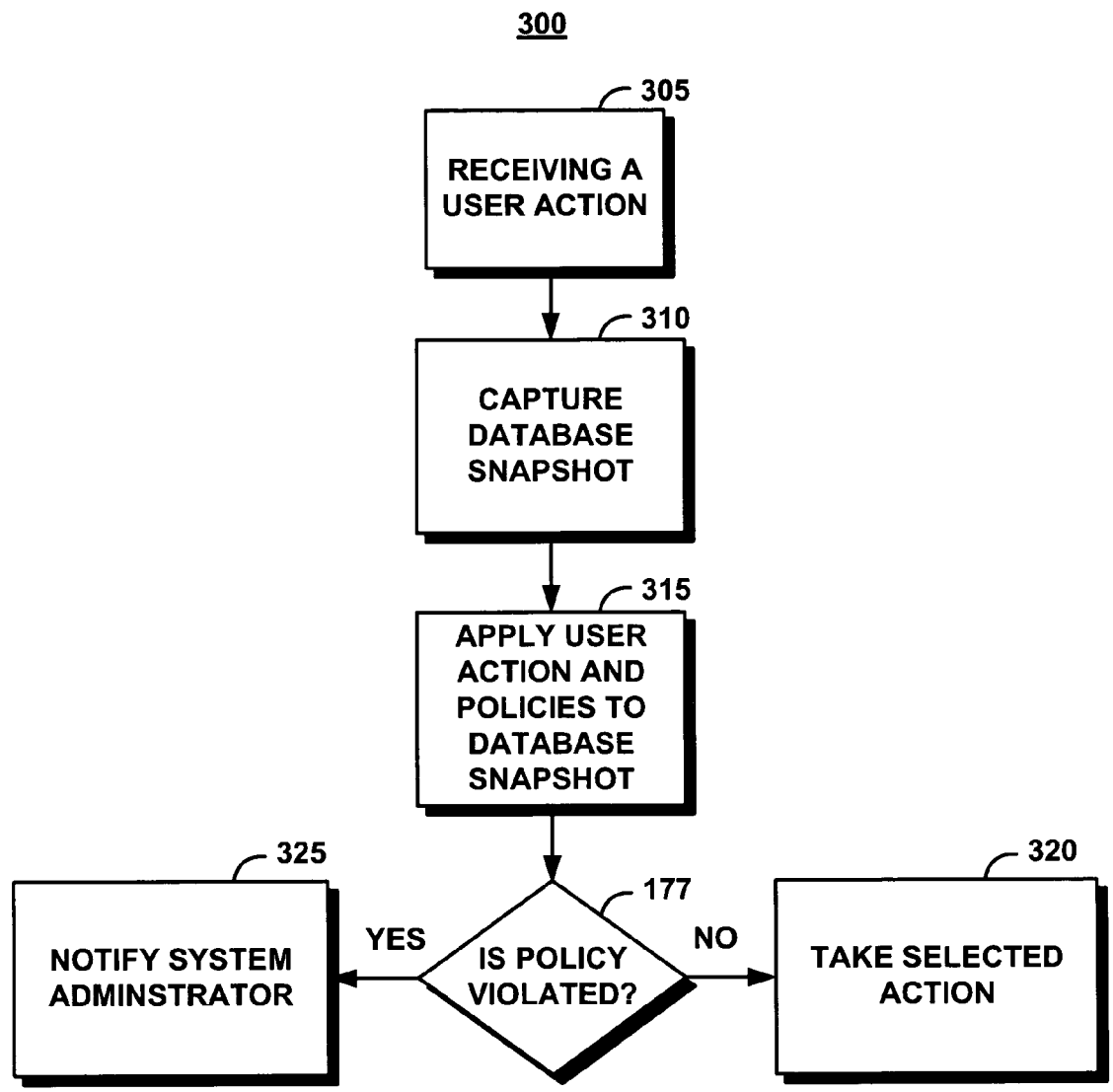
FIG. 3 is a process flow chart illustrating a method of operation of the impact analysis system of FIG. 2.

On the other hand, if any of the policies 165 is violated by the user action 160, system 10 sends a corresponding notification 185 to the system administrator 170 who may then take the appropriate corrective action that affects the performance of system 10. This process is repeated until all the policies 165 are satisfied FIG. 3 illustrates a method 300 of system 10, for implementing an exemplary proactive impact analysis. Upon receiving a user action 160 that could result in changes to the database 140, at step 305, method 300 captures a database snapshot 155 at step 310 using the SAN monitor 150, as explained earlier.

At step 315, method 300 applies the user action 160 and the policies 165 to the database snapshot 155, for analyzing the impact of the user action 160 on the network storage system 100. System 10 then performs the impact analysis at step 177 to determine whether any of the policies 165 is violated by the user action 160.

As explained earlier, if none or the policies 165 is violated (step 320), then method 300 can be programmed to implement a variety of actions such as performing a specific action, logging in data, or display results in a GUI. Otherwise, if at least one policy 165 is violated (step 325), then method 300 notifies the administrator 170 of a potential policy violation, so that the administrator may take the appropriate corrective action.

The impact analysis system 10 is also capable of predicting the state and behavior of the network storage system 100 once a desired user action 160 is performed. In order to evaluate the new state, system 10 needs to interact with various modules within the network storage system 100 to obtain relevant information such as device attributes, policies 165, etc.

Figure 4:
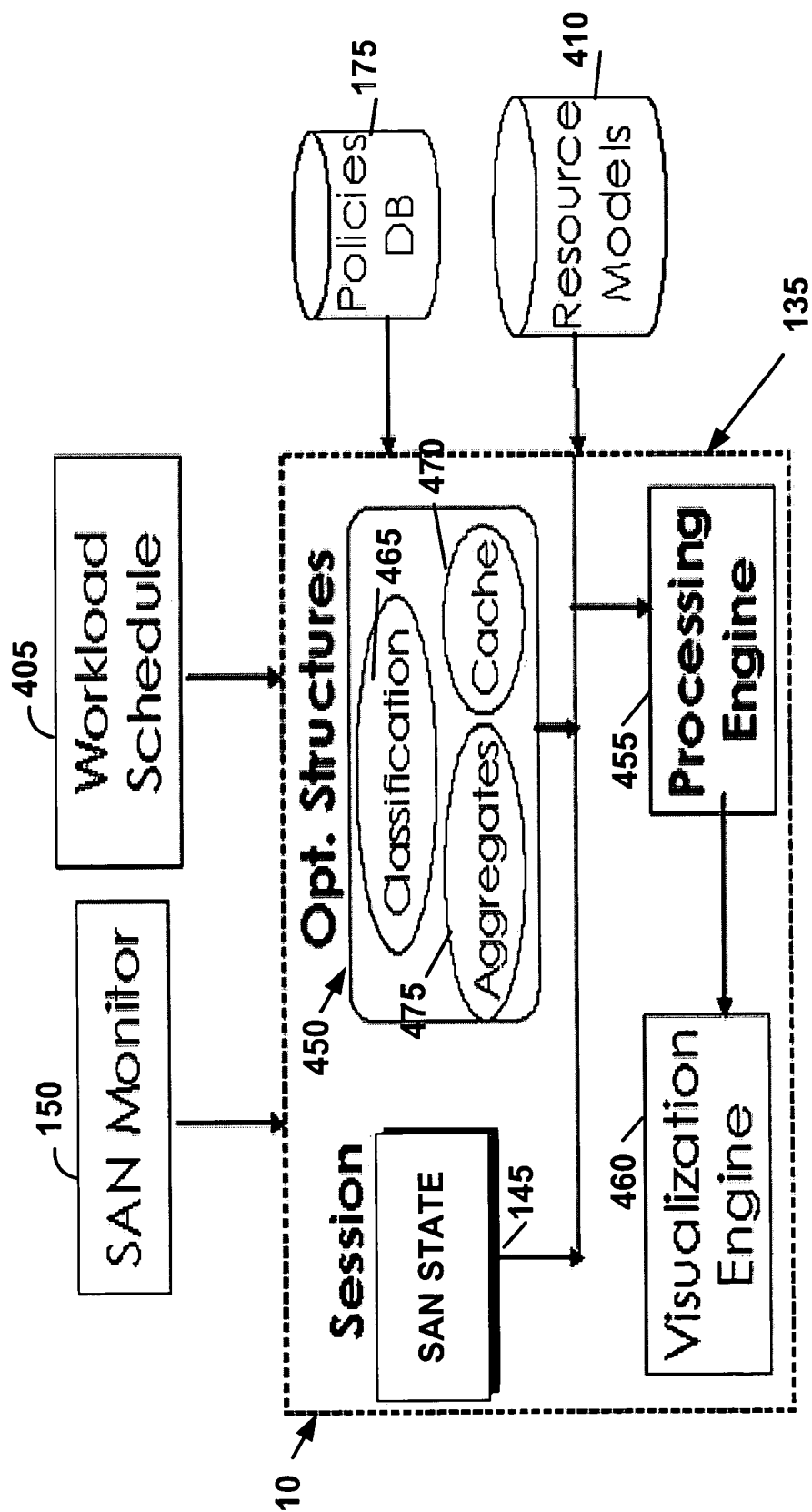
FIG. 4 illustrates an interaction model of the impact analysis system of FIG. 2.

An exemplary interaction model 400 is illustrated in FIG. 4. The present impact analysis system 10 is shown as interacting with the SAN monitor 150 and the policy database 175 (FIG. 2), as well as with a workload schedule 405 and a plurality of resource models 410.

Within this interaction model 400, the SAN monitor 150 provides the state of the network storage system 100. The SAN monitor 150 is typically comprised of a variety of physical configurations, resource attributes such as HBA vendor, number of HBAs in a host, etc., and logical information such as Zoning/LUN Masking.

In order to predict the behavior of the network storage system 100, system 10 interacts with the workload schedule 405 to obtain the correct information on the schedule of the workload. As an example, if a backup job were scheduled for 3 AM, then system 10 needs to account for the additional traffic generated due to the backup during that duration.

One feature of the impact analysis system 10 is its integration with the policy based management. The policy database 175 stores policies 165 that are specified in a high level specification language like Ponder or XML (Extensible Markup Language).

The ability to predict accurately the behavior of the network storage system 100 depends on a plurality of resource models 410 that provide such behavioral models. System 10 uses a model-based approach to evaluate the behavior of resources of the network storage system 100. While in a preferred embodiment, system 10 interacts with the resource models 410 to predict the behavior of the state of the network storage system 100, the design of system 10 is independent of the resource models 410 and can work with any other resource modeling approach. System 10 accepts as inputs, the user action 160 and the time specification at which the impact needs to be analyzed either immediately thereafter or after a specified time interval, and then begins to initiate the impact analysis.

With further reference to FIG. 4, the internal representation of system 10 comprises the following components: the SAN state, a plurality of optimization structures 450, a processing engine 455, and a visualization engine 460. The impact analysis occurs in a session during which the system administrator 170 can analyze the impact of a plurality of user actions 160 incrementally. As an example, the system administrator 170 may wish to analyze the impact of the user action 160 of adding two new hosts to the network storage system 100.

After system 10 evaluates the impact of this action 160, the system administrator 170 may wish to perform an incremental action 160 of adding two other new hosts to the network storage system 100. The SAN state maintains the intermediate states of the network storage system 100 so that such incremental action 160 can be analyzed. When an analysis session is initialized, the SAN state is populated by the current snapshot of the network storage system 100 obtained from the SAN monitor 150.

Figure 5:
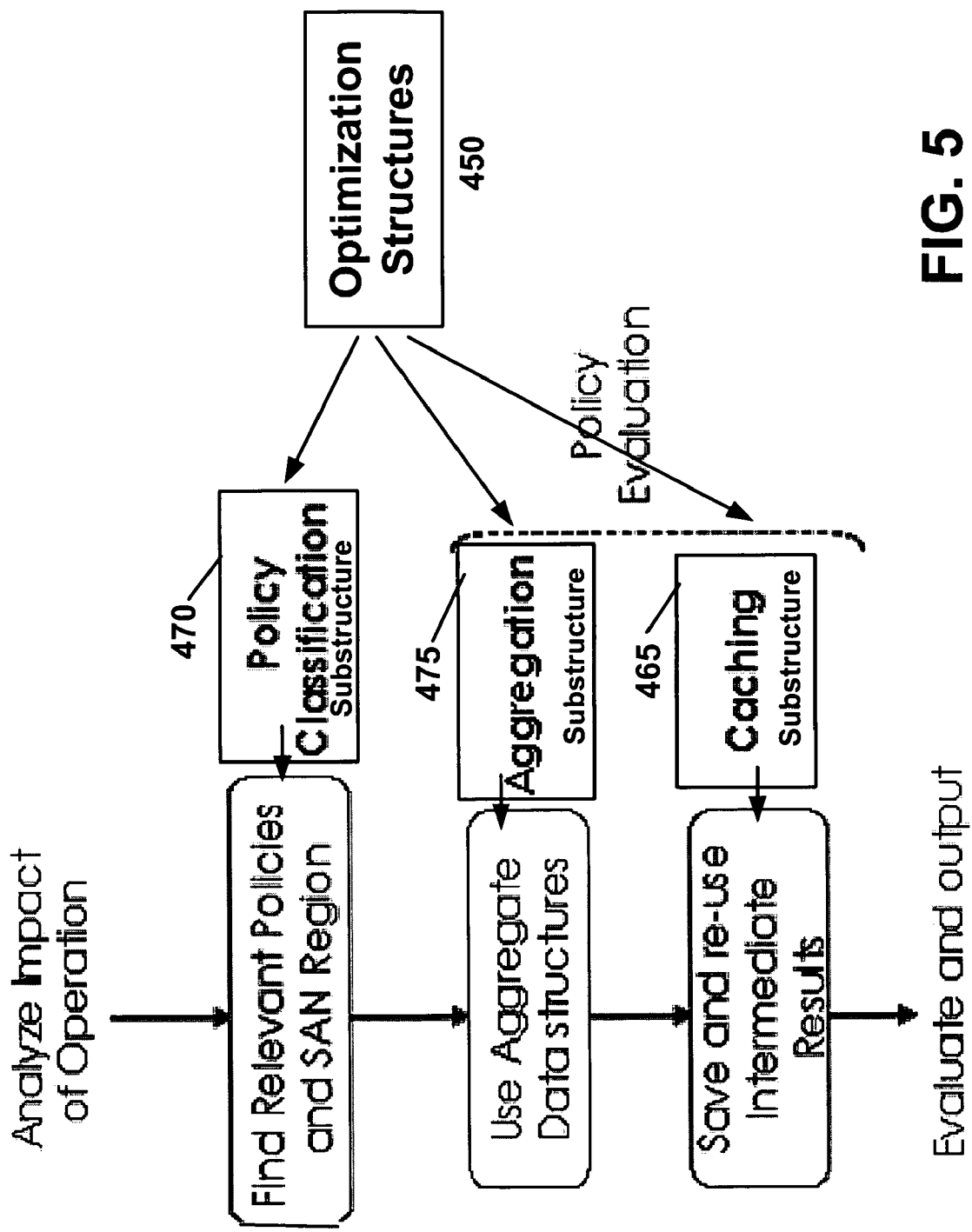
FIG. 5 is a process flow chart illustrating optimization structures of the interaction model of FIG. 4.

With reference to FIGS. 4 and 5, for an efficient evaluation of the user action 160, system 10 maintains intelligent data optimization structures 450 that optimize the overall evaluation. The optimization structures 450 are divided into three substructures: a caching substructure 465, a policy classification substructure 470, and an aggregation substructure 475. Each of these substructures of the optimization structures 450 will be described later in more detail.

The processing engine 255 is responsible for efficiently evaluating the impact of the policy change action 160 on the network storage system 100 using the SAN state and the rest of the internal data structures. It is the main central processing unit of the impact analysis system 10.

The visualization engine 460 provides two kinds of output. First, it can provide an overall picture of the network storage system 100 with various entity metrics and can highlight interesting entities, for example, the ones that violated certain policies 165. Second, with the incorporation of a temporal analysis, the system administrator 170 can plot interesting metrics with time and display them as graphs. These graphs can be used to assess the impact of the user actions 160 on the network storage system 100 over time.

Figure 6:
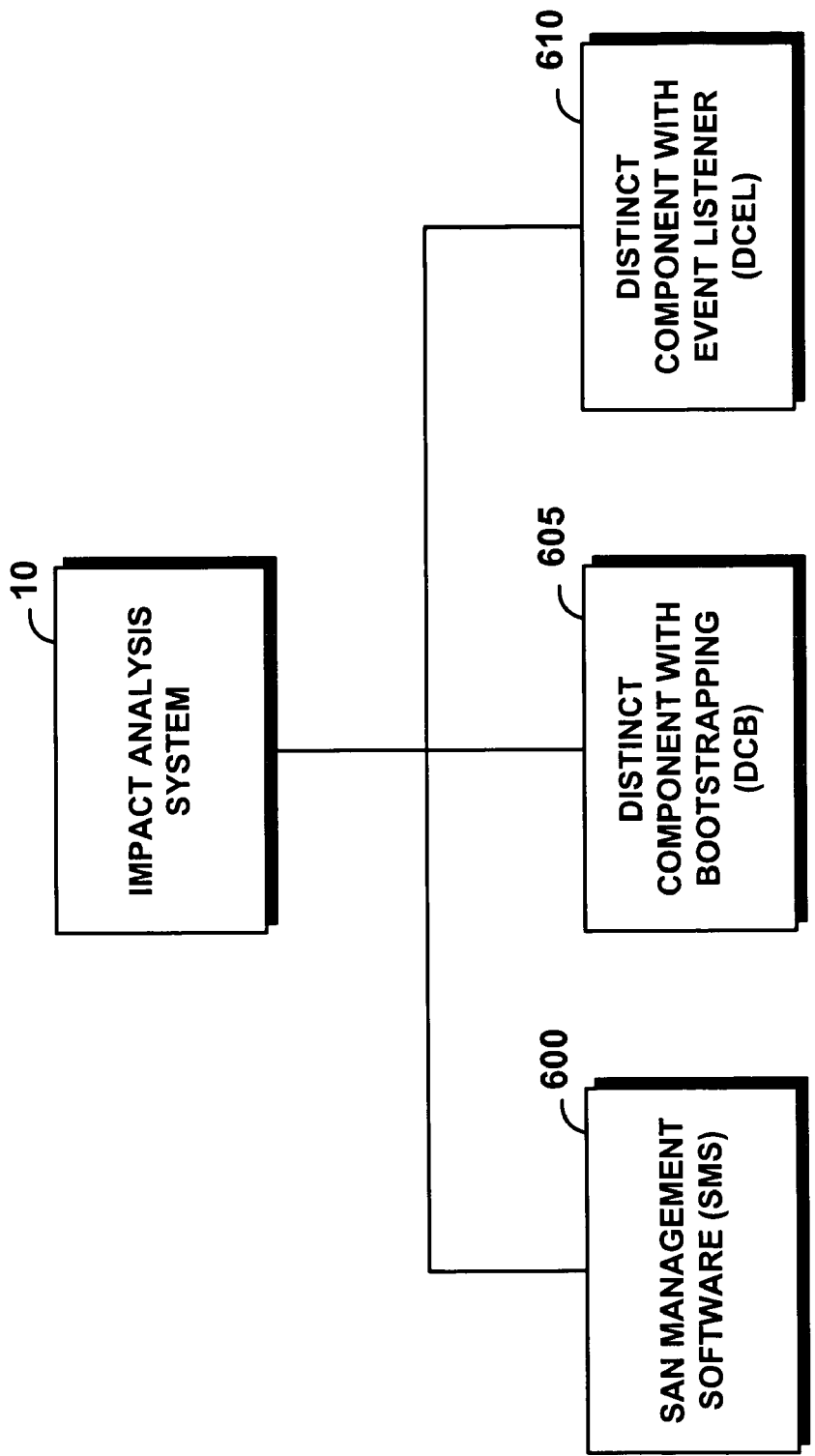
FIG. 6 is a process diagram illustrating various modes of operation of the impact analysis system of FIG. 2 comprising of a SAN management software mode, a distinct component with boostrapping mode, and a distinct component with event listener mode.

Referring now to FIG. 6, system 10 uses a number of internal data structures that are used to optimize the impact analysis. These data structures are derived from the actual network storage system 100 and it is desirable to keep them consistent with the state of the network storage system 100 across multiple impact analysis sessions. This is facilitated by system 10 via the following modes of operation: SAN Management Software (SMS) 600, Distinct Component with Bootstrapping (DCB) 605, and Distinct Component with Event Listener (DCEL) 610.

The SMS mode 600 represents an ideal environment under which the impact analysis system 10 operates. In this mode, the internal data structures are automatically updated by the management software and thus no special operations are required. With the DBC mode 605, all required data structures are generated every time system 10 is run. The data structure generation process keeps system 10 independent of the SAN management software 600. When operated in the DCEL mode 610, system 10 contains an event listener that acts as a "sink" for events generated by the network storage system 100 (standardized under the SNIA SMI-S specification) to keep its data structures updated. In this mode, it would require that system 10 be running at all times. It should be noted that the design of the present system 10 does not have any inherent restrictions and can be modified to operate in any other mode.

To gain a clearer understanding of the operation of system 10, the internal data structures used by system 10 to represent the network storage system 100 and the methods whereby the present system 10 uses these internal data structures to evaluate policies 165 will now be described in more detail.

Figure 7:
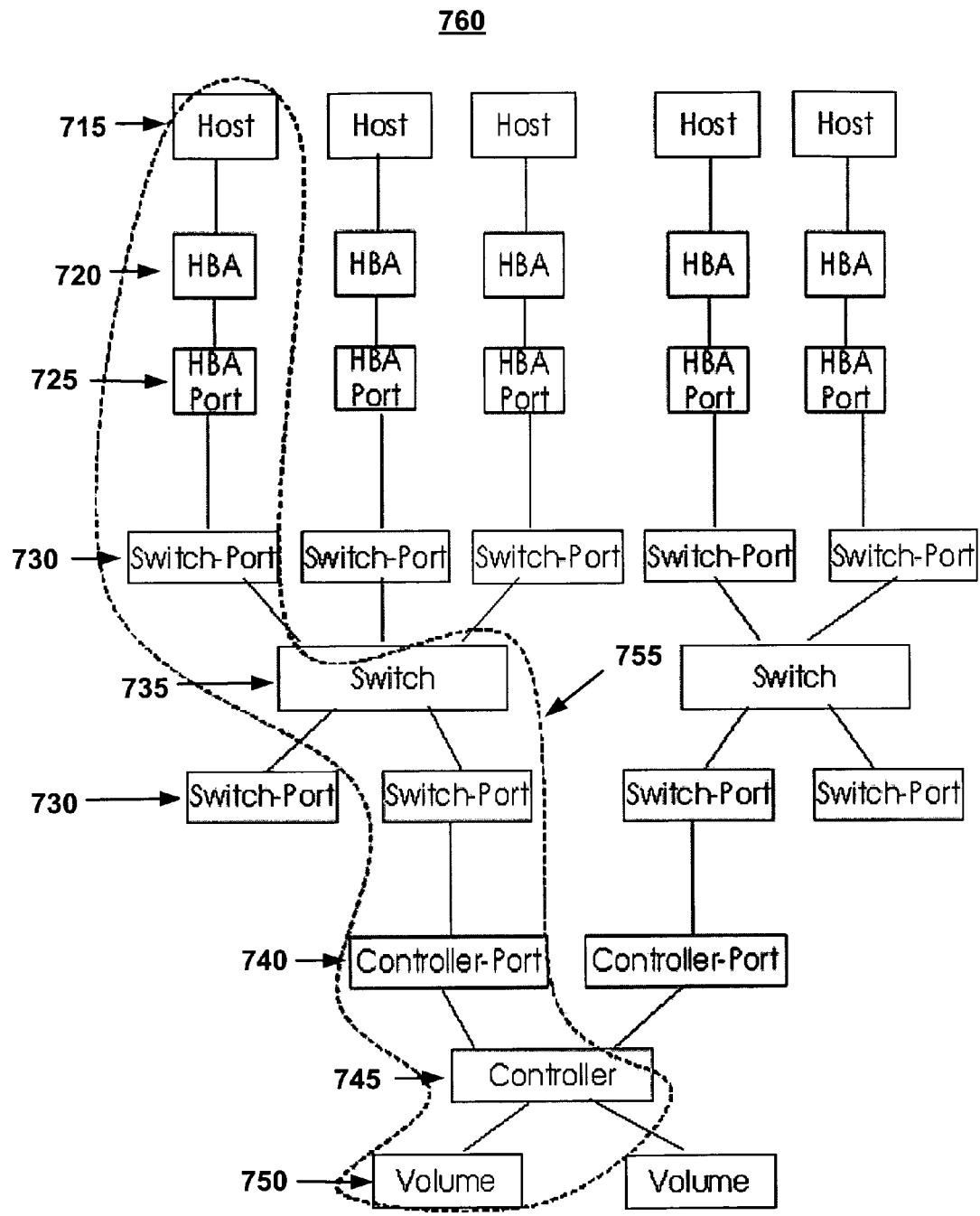
FIG. 7 is an exemplary resource graph that graphically represents the network storage system of FIG. 1.

FIG. 7 represents the network storage system 100 in an optimal form for efficient impact analysis, since all the policies 165 and resource metric computations would obtain required data through the SAN data structure. The network storage system 100 is represented as a resource graph 760.

The exemplary representation of the network storage system 100 shown in FIG. 7 includes various entities such as a plurality of hosts 715, a plurality of HBAs 720, a plurality of HBA ports 725, a plurality of switch ports 730, a plurality of switches 735, a plurality of controller ports 740, a controller 745, and a plurality of storage volumes 750. A single SAN path 755 is shown to connect a host 715 to a storage volume 750. It should be noted that the SAN path 755 could include more than a single switch in.

Each entity in the graph 760 has a number of attribute-value pairs. For example, the host entity 715 has attributes such as vendor, model, OS, etc. In addition, each entity contains pointers to its immediate neighbors, for example, a host 715 has a pointer to its HBA 720, which has a pointer to its HBA port 725. This immediate neighbor maintenance and extensive use of pointers with zero duplication of data allows the resource graph 760 to be maintained in memory even for huge network storage systems 100.

In conventional systems, policies are generally specified in a high level specification language like Ponder or XML. The conventional frameworks convert the policies into executable codes that can evaluate the policies when triggered. This operation uses an underlying data layer, such as one based on the SMI-S (Storage Management Initiative-Specification) specification, that obtains the required data for evaluation. This automatic code generation generally produces executable codes that are non-optimized, hence very inefficient when deployed in the conventional systems.

In contrast, in system 10, the data is obtained through the SAN data structure represented as the exemplary resource graph 760. For evaluating a user action 160, such as "all hosts 715 from the vendor A should be connected to storage volumes 750 from the vendor S", a resource graph traversal is required to connect the storage volumes 750 from the vendor S to the hosts 715 from the vendor A. In order to perform such resource graph traversals, each entity in the resource graph 360 supports an API (Application Program Interface) that is used to get to any other connected entity in the resource graph 760 by doing recursive function calls to its immediate neighbors.

As an example, the hosts 715 from the vendor A may support a procedure or recursive function getController( ) that returns all the connected storage volumes 750 as pointers. The recursive functions are implemented by looking up the immediate neighbors of the hosts 715 which are the HBAs 720, calling the respective recursive function getController( ), aggregating the pointer results, and removing duplicate pointers. The neighbors HBAs 720 would recursively do the same with their immediate neighbors which are the HBA ports 725. This recursive function call is repeated with every neighbor entity until the recursive function call reaches the desired entity that is the storage volume 750 from the vendor S. This API is also useful for the caching substructure 465, whereby the results of these recursive function calls at all intermediate nodes are cached for reuse in later policy evaluations.

In addition, the entity API allows for passing of filters that can be applied at intermediate nodes in the exemplary SAN path 755. As an example, for a user action 160 that requires "a host 715 from the vendor A to be connected to a storage volume 750 from the vendor S via a switch 735 from the vendor W", the filter would be represented abstractly as {Switch.Vendor="W"}. The host 715 would then call the recursive function getController( ) from the HBA 720 with the filter {Switch.Vendor="W"}. When this function call recursively reaches the switches 335, it would check whether or not they satisfy the filter. For the switches 735 that satisfy the filter, the recursive function call continues to their neighbors. The switches 735 that do not satisfy the filter result in the recursive function getController( ) returning a null pointer. The use of filters prevents unnecessary traversals on the SAN paths 755 that do not yield any results. As an example, SAN paths 755 to the storage volumes 750 are connected through switches 735 from other vendors. The filters support many comparison operations such as ≧(greater than or equal), ≦(less than or equal), >(greater than), <(less than), =(equal), ≠(not equal), ∈Logical operations OR, AND & NOT on filters are also supported.

The traversal of the resource graph 760 can also be done only for logical connections due to zoning. This is facilitated by providing equivalent API functions for traversing links with end points in a particular zone. For example, the function getControllerLogical(Z) obtains all connected controllers 745 in zone Z, that is, all controllers 745 reachable through a SAN path 755 containing ports entities including the HBA ports 725, the switch ports 730, and the controller ports 740 in zone Z.

Figure 8:
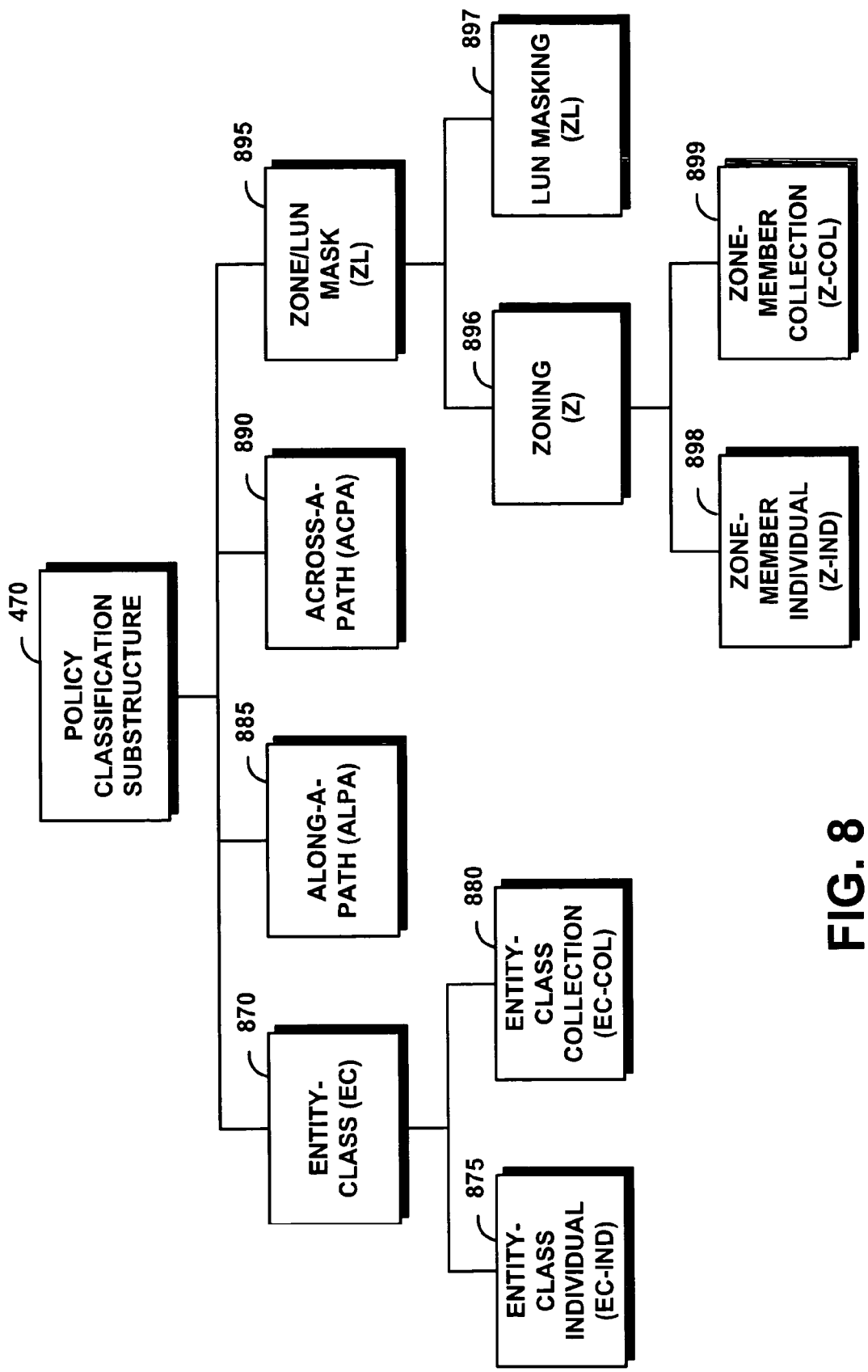
FIG. 8 is a schematic diagram of a construct of a policy classification method that forms part of the process of FIG. 5.

With reference to FIGS. 5 and 8, system 10 utilizes the optimization structures 450 to perform the proactive impact analysis of the user action 160 on the network storage system 100. The optimization structures 450 are important to the scalability and efficiency of the impact analysis.

As described earlier in connection with FIGS. 4 and 5, the optimization structures 450 are generally divided into three general substructures. The policy classification substructure 470 is used to find relevant policies 165 and relevant regions of the network storage system 100 that are affected by the user action 160. The caching substructure 465 is used to exploit data locality or commonality across different policies 165 or across different evaluations for different entity instances. The aggregation substructure 475 is implemented to perform efficient evaluation of certain classes of policies 165 by keeping certain aggregate data structures. Both the caching substructure 465 and the aggregation substructure 475 are designed for efficiency in the policy evaluation. All three optimization substructures are independent of each other and can be used individually. However, in some applications, the optimal performance is usually achieved by the combination of all three optimization substructures.

The policy classification substructure 470 helps in identifying the relevant regions of the network storage system 100 and the relevant policies 165 whenever the user action 160 is performed. In order to identify the relevant regions of the network storage system 100 affected by the user action 160, the policies 165 are classified into four categories.

As shown in FIG. 8, the four classification categories of the policy classification substructure 470 include Entity-Class (EC) policies 870, Along-a-Path (ALPA) policies 885, Across-a-Path (ACPA) policies 890, and Zoning/LUN-Masking (ZL) policies 895. The policy classification substructure 470 only uses the "if" condition of the policies 165. Also, each policy class 870, 885, 890, and 895 has a set of operations that can trigger a policy 165. The mapping of operations to policies 165 can be facilitated by the classification scheme in system 10 to find the relevant set of policies 165.

The Entity-Class (EC) policies 870 are defined only on the instances of a single entity class. For example, with reference to FIG. 7, an EC policy 870 may be "all HBAs 720 should be from the same vendor, and all switches 745 from the vendor W must have a firmware level>x where x is a level designation value". Such EC policies 870 do not require any resource graph traversals, but rather require a scan of the list of instances of the entity class. The relevant operations for the EC policies 870 are addition and deletion of an entity-instance or modification of a dependent attribute such as the vendor name and the firmware level. The dependent attributes are required to be checked in order to evaluate the EC policy 870 of an instance, such as "changing the firmware level of a switch 345".

The EC policies 870 can be subdivided into two types: an individual (EC-Ind) policy 875 and a collection (EC-Col) policy 880. The EC-Ind policy 875 holds on every instance of the entity class. For example, an EC-Ind policy 875 may be "all switches 745 must be from the vendor W". The EC-Ind policy 875 has a characteristic that whenever an instance of the entity class is added or modified, the EC-Ind policy 875 only needs to be evaluated on the new member.

The EC-Col policy 880 holds on a collection of instances of the entity class. For example, an EC-Ind policy 880 may be "the number of ports of type X where X is a HBA port 725, a switch port 730, or a controller port 740, in the fabric is less than N and all HBAs 720 should be from the same vendor". In order to evaluate the change policy action 160 for the new instance, the EC-Ind policy 880 is required to get information about existing instances. This class of EC-Col policies 880 might require checking all instances for final evaluation.

The Along-a-Path (ALPA) policies 885 are defined on more than one entity on a single SAN path 755 (FIG. 7) of the network storage system 100. For example, an ALPA policy 885 may be "all hosts 715 from the vendor A must be connected to storage volumes 750 from the vendor S". Importantly, the ALPA policies 885 have a characteristic that the policy 165 is required to hold on each SAN path 355. In the foregoing example, this would mean that each and every SAN path 755 between the hosts 715 and the storage volumes 750 must satisfy the exemplary ALPA policy 385. This characteristic implies that, upon invoking any operation, there is no need to evaluate the ALPA policies 885 on any old SAN path 755, but only on a new SAN path 755. The relevant operations for the ALPA policies 885 are addition, deletion, and modification of SAN paths 755 or modification of a dependent attribute of a dependent entity on the SAN path 755, such as the vendor name as a dependent attribute and the storage volumes 350 as a dependent entity.

The Across-a-Path (ACPA) policies 890 are defined across multiple SAN paths 755 of the network storage system 100. For example, nn ACPA policy 990 may be "all hosts 715 should have at least two and at most four disjoint SAN paths 755 to storage volumes 750, and a host 715 from the vendor A should be connected to at most five controllers 745". The ACPA policies 890 cannot be decomposed to hold on individual SAN paths 755 for every operation. In the foregoing example, adding a host 715 requires checking only for the new SAN paths 755 being created, whereas adding a switch-to-controller link requires checking on earlier SAN paths 755 as well. The relevant operations for these ACPA policies 890 are addition, deletion, and modification of SAN paths 755 or modification of a dependent attribute of a dependent entity on the path.

The Zoning/LUN-Masking (ZL) policies 895 are defined on zones or LUN-Mask sets of the network storage system 100. The ZL policies 895 can be further divided into Zoning (Z) policies 896 and LUN-Masking (L) policies 897. The policy approaches for the Z policies 496 and the L policies 497 are the same. Thus, in the subsequent description, only the Z policies 496 are further explained, with the understanding that a similar description is also applied to the L policies 497, unless otherwise noted.

For example only, a Z policy 496 may be "a zone should have at most N ports and a zone should not have OS 1 or operating system OS2 hosts 715". The ZL policies 895 are similar to the EC policies 870 with entity-class being analogous to zones or LUN-Mask sets. Thus, the Z policies 496 are defined on attributes of zone instances.

Further, the Z policies 496 can be collection policies, requiring evaluation over multiple zones, for example, "the number of zones in the fabric should be at most N". The Z policies 496 can also be individual policies, requiring evaluation only over an added or modified zone, for example, "all hosts in the zone must be from the same vendor". Moreover, within a zone, a Z policy 496 may require evaluation over only the added or modified component, herein referred to as a Zone-Member-Ind policy 898, or all components, herein referred to as Zone-Member-Col policy 899. For example, a Zone-Member-Ind policy may be "all hosts in the zone should be operating system OS1" and a Zone-Member-Col policy may be a "zone should have at most N ports". The relevant operations for this class of Z policies 496 are addition and deletion of a zone instance or modification of an instance such as addition or deletion of ports in the zone.

It should be noted in a preferred embodiment, the policy classification method 470 does not semantically classify all conceivable policies 165, but rather to identify those policies 165 that can be optimized for evaluation. Nonetheless, it is possible to classify all publicly available policies 165 collected from domain experts using the present policy classification method 470. In addition, while the present policy classification method 470 utilizes the foregoing policy classes, it is not necessarily limited to this categorization. Another distinguishing feature is that, while conventional policy classification methods classify policies based on specification criteria, the present policy classification method 470 uses the internal execution criteria for the classification. This is a more efficient method for generating optimized evaluation code by checking only the relevant regions of the network storage system 100.

Figure 9:
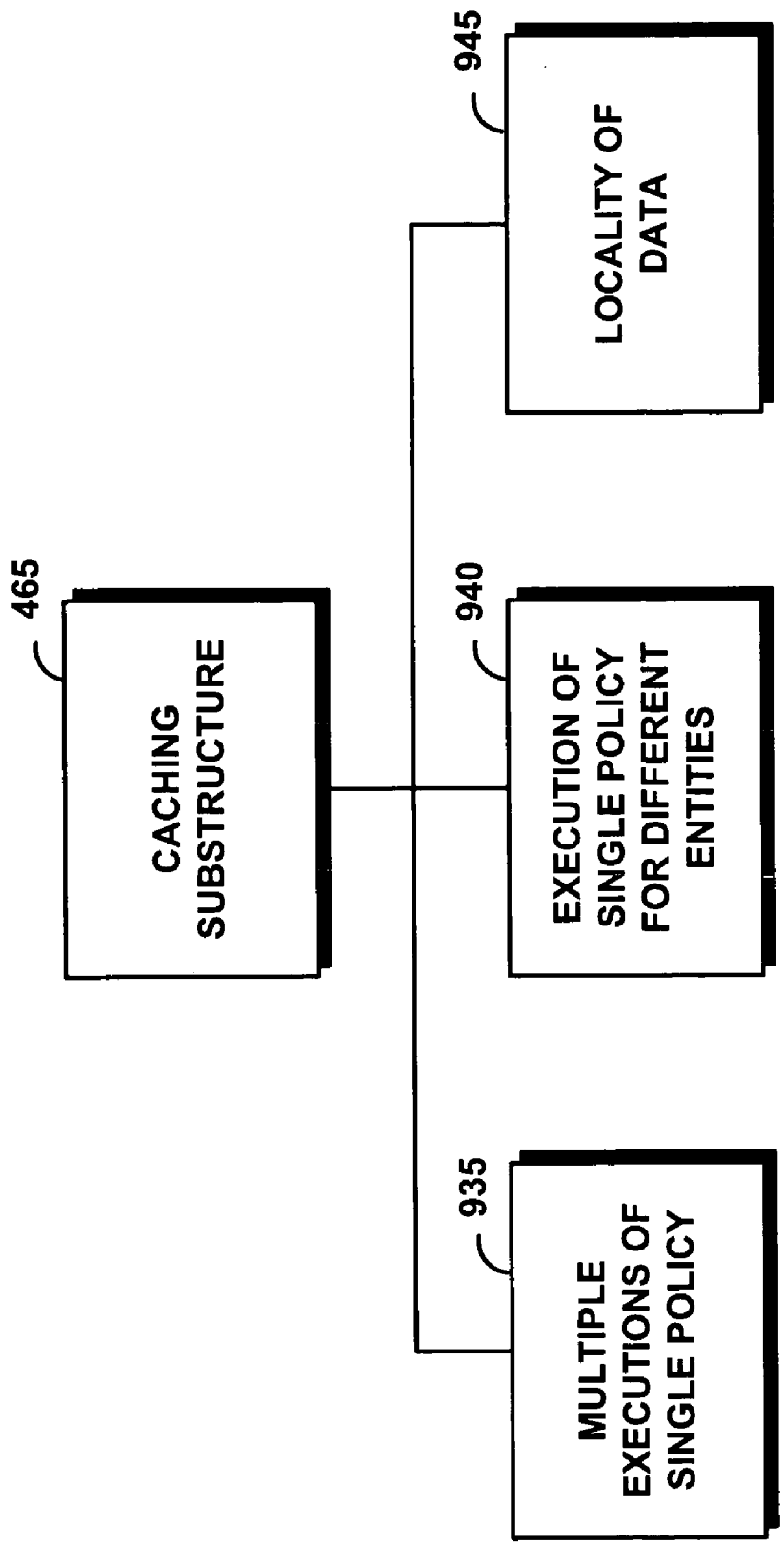
FIG. 9 is a schematic diagram of various modes of operation of a caching method that forms part of the process of FIG. 5.

Referring now to FIG. 9, the second substructure of the optimization structures 450 is the caching substructure 465 to cache relevant data at all nodes of the resource graph. Such a method is quite useful in the present system 10 due to the commonality of data accessed in a variety of different modes including multiple executions mode 935 of a single policy 165, execution mode 940 of a single policy 165 for different instances of entities, and locality of data mode 945 required across multiple policies 165.

In the modes 935 involving multiple executions of a single policy 165, a single policy might be executed multiple times on the same entity instance due to the chaining of actions defined in the "then" clause of the violated policies 165. Any previous evaluation data can be easily reused.

In the modes 940 involving execution of a single policy 165 for different instances of entities. For example, the system administrator 170 considers the user action 160, such as "all hosts 715 from the vendor A should be connected to storage volumes 750 from the vendor S". For impact analysis, the exemplary user action 160 needs to be evaluated for all hosts 715. Using the immediate neighbor recursive function calls for the evaluation of this user action 160, a specific host 315, i.e., host H, would call the recursive function getController( ) from the HBAs 720, which in turn would call the recursive function getController( ) from the HBA ports 725, which would call the edge switch 735, say switch L, and so on. When any other host 715 connected to the switch L calls the recursive function getController( ), it can reuse the data obtained during the previous evaluation for the host H. It should be noted that with no replacement, the caching substructure 465 implies that traversal of any edge during a policy evaluation for all entity instances is done at most once. This is due to the fact that after traversing an edge once, the required data from one end point of the edge would be available in the cache at the other end point, thus preventing its repeated traversal.

In the modes 945 involving locality of data required across multiple policies, it is also possible, and often the case, that multiple policies 165 require accessing different attributes of the same entity. System 10 does not apply filters to the "edge" entities and retrieve the full list of entities. This cached entry can be used by multiple policies, even when their "dependent" attributes are different.

The caching substructure 465 incorporates filters as described previously. Whenever an API function is called with a filter, the entity saves the filter along with the results of the function call and a cache hit at an entity occurs only when there is a complete match, that is, the cached entry has the same API function call as the new request and the associated filters are also the same. The present caching substructure 465 uses LRU (L R U) for replacement.

Cache consistency is an important issue with the caching substructure 465. The present system 10 resolves the cache consistency issue in a manner that will be described later. Since system 10 operates on the database snapshot 155 of the SAN state, once the impact analysis session is initialized, events generated from the actual network storage system 100 are not accounted for in that session. Therefore, a cache created during the impact analysis session will not be invalidated due to any concurrent real events occurring in the network storage system 100.

However, it is possible that some user action 160, when triggered, may cause an automatic operation that invalidates a cache. Be for example only, an automatic rezoning operation can invalidate the cache entries getControllerLogical( ). When this would happen, the system 10 would handle the invalidation by finding all SAN paths 755 through the entity modified by the applied operation. Only those SAN paths 755 that can potentially have stale caches would need to be invalidated. The invalidation process presents itself as resource costs. However, these resource costs are limited due to the fact that any triggered automatic operation is also required to be analyzed for impact and during that process such SAN paths 755 would have to be checked for various policies 165 anyway. Thus, the invalidation process is piggy-backed on the analysis process, causing little additional resource costs.

The third substructure for the optimization structures 450 is the aggregation substructure 475. The aggregation substructure 475 improves the efficiency of policy execution by keeping certain aggregate data structures. For example, the system administrator 170 may consider the user action 160 that mandates that "the number of ports in a zone must be at least M and at most N". With every addition and deletion of a port in the zone, this user action 160 needs to be evaluated. However, each evaluation would require counting the number of ports in the zone. By keeping an aggregate data structure that keeps the number of ports in every zone, whenever a port is added or deleted, the policy evaluation reduces to a single check of the current count value.

Figure 10:
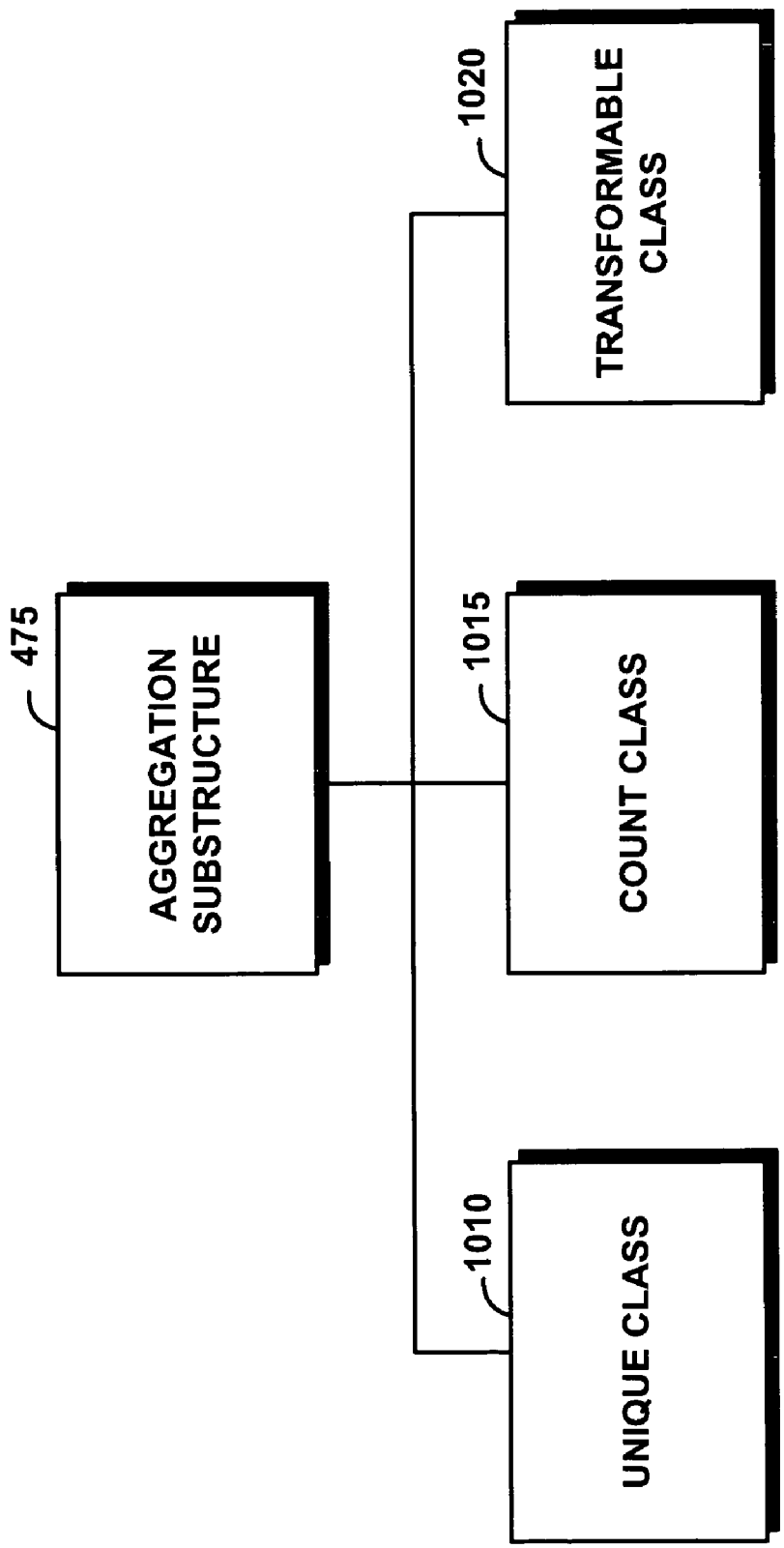
FIG. 10 is a schematic diagram of various policy types of the aggregation method that forms part of the process of FIG. 5.

With reference to FIG. 10, the aggregation substructure 475 generally operates on three classes of policies 165 that have simple aggregate data structures: unique policies 1010, count policies 1015, and transformable policies 1020. The unique policies 1010 require a certain attribute of entities to be unique. For example, a unique policy 1010 may be "the WWNs (World Wide Names) of all devices should be unique and all Fibre Channel switches must have unique domain IDs". For such policies 1010, a hash table is generated on the attribute and the unique policy 1010, when triggered, is evaluated by looking up that hash table. This aggregate data structure can provide good performance improvements especially in big network storage systems 100.

The count policies 1015 require counting a certain attribute of an entity. Keeping the count of the attribute prevents repeated counting whenever the policy 165 is required to be evaluated. Instead, the count aggregate is either incremented or decremented when the entity is correspondingly either added or deleted.

It is possible to transform many complex policies 165 into transformed policies 1020 with less complexity by keeping additional information about some of the dependent entities. For example, a policy 165 may be "all storage volumes 750 should be from the same vendor". This policy 165 is an EC-Col policy 880 for the entity class of storage volumes 750. By keeping information about the current type of the storage volumes 750, say type T, in the network storage system 100, the policy 165 can be reduced to an equivalent EC-Ind policy 875 that "all storage volumes 750 should be of type T". The equivalent EC-Ind policy 875 is now a transformed policy 1020. For the transformed policies 1020, a pointer to the entity that provides the value to aggregate is also stored as required since the aggregate structure can be invalidated when the entity is deleted.

An exemplary pseudo-code for the impact analysis system 10 is included below:

```
for each affected entity
{
    find policies that have the modified attribute as a
dependent attribute
    {
        for such EC-Ind policies, only check
for the modified entity.
        for such EC-Col policies, evaluate the
policy over the entire class
    }
        find zones containing that entity
        find policies that have the modified
attribute as a dependent attribute
    {
        for ZL-Ind, ZL-Member-Ind policy, only check
for that entity
        for ZL-Ind, ZL-Member-Col policy, check
for entities in the zone
        for ZL-Col, check for all zones
    }
        find any ALPA/ACPA policies with the affected
attribute as a dependent attribute
    {
        check those ALPA policies on the paths
containing that entity
            check those ACPA policies for all paths
    }
        if new paths have been added/deleted
    {
            if paths have been added
        {
            check all ALPA policies only for
the newly added paths
        }
            check ACPA policies for all paths
        }
}
```

It is to be understood that the specific embodiments of the invention that have been described are merely illustrative of certain applications of the principle of the present invention. Numerous modifications may be made to the system and method for proactive impact analysis of policy-based storage described herein without departing from the spirit and scope of the present invention.

What is claimed is:

1. A processor-implemented method for proactively assessing the impact of a user action on a network storage system that includes a database represented by states and policies, before execution of the user action, the method comprising:

classifying said polices in a plurality of policy classes; wherein said policies comprise:

at least one individual entity-class policy defined only on instances of an entity class and holding on every instance of an entity class;

at least one collection entity-class policy defined only on instances of an entity class and holding on a collection of instances from the entity class;

at least one individual zone policy defined on attributes of zone instances of the network storage system and requiring evaluation over only one of an added zone and a modified zone;

at least one collection zone policy defined on attributes of zone instances of the network storage system and requiring evaluation over multiple zones;

receiving said user action;

capturing a snapshot of the database states;

maintaining intermediate states of said database states of said network storage system;

maintaining attributes of said network storage system, wherein said attributes may include vendor, model, and operating system type;

simulating the user action on the snapshot without applying changes to the database;

selectively applying at least one of the policies to the snapshot;

analyzing whether the simulated user action violates at least one of said applied policies, wherein said analyzing includes:

predicting behaviour of resources of said network storage system using at least one independent resource model;

generating intelligent data optimization structures each time the method is run;

using the intelligent data optimization structures regarding evaluation of said simulated user action, using an independent caching substructure, an independent policy classification substructure, and an independent aggregation substructure;

finding relevant policies and relevant regions affected by said simulated user action using said independent policy classification substructure;

specifying said relevant policies in a high level specification language, wherein said high level specification language is selected from Ponder and Extensible Markup Language;

exploiting data locality and commonality across different policies and across different evaluations using said independent caching substructure;

performing evaluation of said classes of policies using said independent aggregation substructure; and creating a policy using a set of operations found within said policy classes;

assessing an impact of at least one of said policies on a future event; and outputting visualization information regarding said impact of said user action on said network storage system over time.

2. The method according to claim 1, wherein applying the policies includes applying the policies incrementally.

3. The method according to claim 1, further comprising if the simulated user action violates at least one applied policy, taking a corrective action.

4. The method according to claim 3, wherein taking the corrective action comprises changing at least one of the policies.

5. The method according to claim 1, further comprising if the simulated user action does not violate at least one applied policy, said network storage system taking an execution forwarding action.

6. The method according to claim 5, wherein taking said execution forwarding action comprises forwarding the user action to an action execution level.

7. The method according to claim 6, wherein forwarding the user action to the action execution level comprises performing a specific execution action.

8. The method according to claim 5, wherein taking said execution action comprises sending an analysis result to a user interface.

9. The method according to claim 5, wherein taking said execution action comprises logging an analysis result of said simulated user action.

* * * * *